A. ADAM.
MEANS FOR PROTECTING BOLTS, NUTS, &c.
APPLICATION FILED JUNE 21, 1904.

972,140.

Patented Oct. 4, 1910.

Witnesses:
Frank E. French

Inventor:
Antoine Adam
By Augustin B. Stoughton
Attorney

UNITED STATES PATENT OFFICE.

ANTOINE ADAM, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

MEANS FOR PROTECTING BOLTS, NUTS, &c.

972,140.  Specification of Letters Patent.  Patented Oct. 4, 1910.

Application filed June 21, 1904. Serial No. 213,492.

*To all whom it may concern:*

Be it known that I, ANTOINE ADAM, a citizen of the United States, residing at Philadelphia, in the county of Philadelphia and State of Pennsylvania, have invented new and useful Means for Protecting Bolts, Their Nuts, and the Like, of which the following is a description.

In many situations such as where storage batteries are located, fumes or gases are present which attack many metals that are also employed. It is customary to coat such metal parts with other metals such as, for example, lead which resists the attacks of such fumes and gases. Bolts coated with resisting metal or material are employed in connection with metal parts in such situations, but the nuts in their application to the bolts tend to and do remove and abrade the coating, leaving the threaded ends of the bolts to be attacked by such fumes and gases.

It is the object of the present invention to provide means for obviating these difficulties and to protect the threaded ends of bolts and the like from which the coating may have been wholly or partially removed, and stated in general terms, the invention comprises a receptacle adapted to contain if required a protecting substance such as vaseline and to receive the end of the bolt and provided with means for detachably securing it to the bolt or a part connected therewith.

The invention also comprises the improvements to be presently described and finally claimed.

The nature, characteristic features and scope of the invention will be more fully understood from the following description taken in connection with the accompanying drawings forming part hereof and in which—

Figure 1:
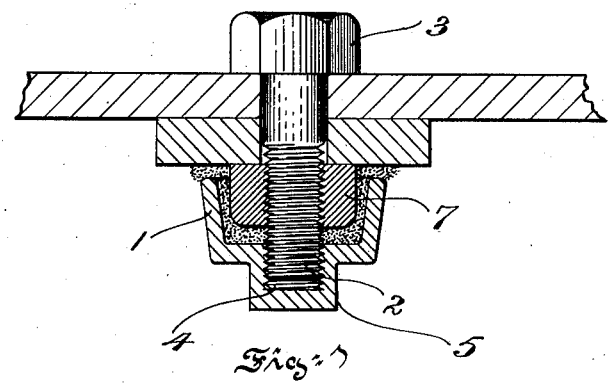
Figure 2:
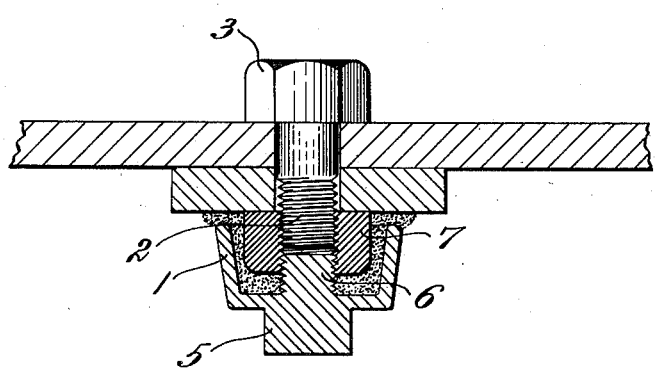
Figure 3:
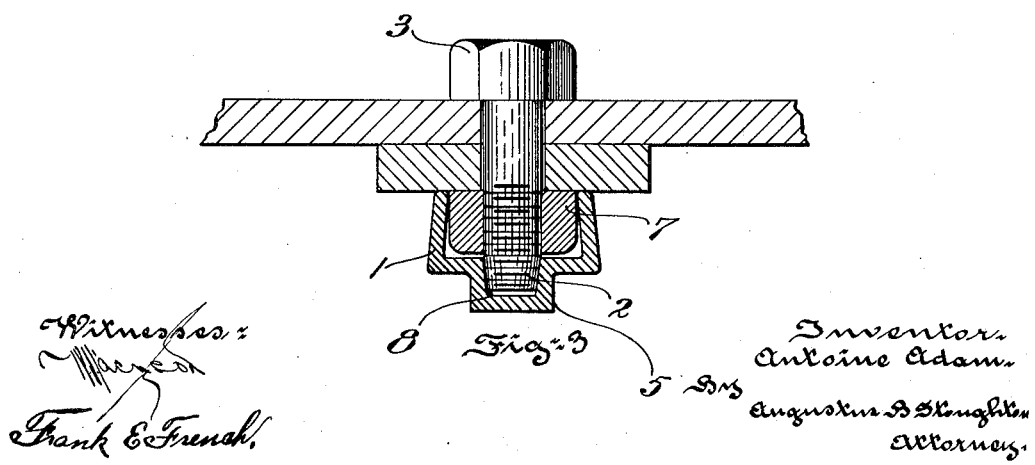

Figure 1, is a sectional view illustrating means embodying features of the invention, and Figs. 2 and 3 are similar views illustrating modifications thereof.

In the drawings 1, is a cup or receptacle adapted to contain vaseline or other protecting material and to receive the end 2 of the bolt 3 which may be coated with protecting material and the threaded end of which it is desired to protect. Provision is made for securing this cup 1 to place as shown in the drawings. In Fig. 1, the cup is provided with a threaded socket 4 into which the end of the bolt 3 is screwed. The cup is also shown as provided with a portion 5 for the reception of a wrench, by means of which it can be readily applied to place. As shown in Fig. 2, the cup is provided with a threaded projection 6 which may be screwed into the nut 7 which in its turn is applied to the bolt 3. As shown in Fig. 3, the cup 1, is arranged to be driven onto the end of the bolt and for this purpose it may be provided with a socket 8 that can be beveled.

The cup itself is made of some material which will resist the fumes or gases to which it is exposed and it serves to hold the vaseline or other protecting material in place, so as to protect the end of the bolt and also the nut 7, and also any parts the coating of which may have been abraded or removed by the application or the removal of the nut 7 and bolt 3.

In some instances the vaseline may be omitted and in such cases the lip of the receptacle is drawn up against the surface of the bolted member.

It will be obvious to those skilled in the art to which the invention relates that modifications may be made in details without departing from the spirit thereof, hence the invention is not limited further than may be required by the prior state of the art, but

Having thus described the nature and objects of my invention what I claim as new and desire to secure by Letters Patent is:

1. Means for protecting the ends of bolts and their holding nuts and the like from the attack of fumes or gases which comprise the combination of the bolt and its holding nut and an imperforate cuplike receptacle of non-corrosive material adapted to receive and cover and inclose both the holding nut and the bolt-end and provided with means for securing it thereto, substantially as described.

2. Means for protecting bolt-ends and their holding nuts and the like from the attack of fumes or gases which comprise the combination of the bolt-end and holding nut, an imperforate cuplike receptacle covering and inclosing the holding nut and bolt-end with space between and provided with means for securing it to place, and protecting material arranged in said space and contained in the receptacle, substantially as described.

In testimony whereof I have hereunto signed my name.

ANTOINE ADAM.

Witnesses:
BRUCE FORD,
LEONARD H. WORNE.